United States Patent [19]

Eisinger et al.

[11] Patent Number: 5,100,979
[45] Date of Patent: Mar. 31, 1992

[54] PROCESS FOR PRODUCING ETHYLENE/1-OCTENE COPOLYMERS HAVING REDUCED STICKINESS

[75] Inventors: Ronald S. Eisinger, Charleston; Kiu H. Lee, South Charleston, both of W. Va.

[73] Assignee: Union Carbide Chemicals & Plastics Technology Corporation, Danbury, Conn.

[21] Appl. No.: 624,970

[22] Filed: Dec. 10, 1990

[51] Int. Cl.$^5$ .................... C08F 2/34; C08F 210/02
[52] U.S. Cl. .................... 526/88; 526/129; 526/144; 526/348.2; 526/901
[58] Field of Search ............ 526/88, 129, 144, 348.2, 526/901, 905, 73

[56] References Cited

U.S. PATENT DOCUMENTS

| | | | |
|---|---|---|---|
| 4,469,855 | 9/1984 | Cooper | 526/901 X |
| 4,508,842 | 4/1985 | Beran et al. | 526/129 X |
| 4,857,611 | 8/1989 | Durand et al. | 526/88 |

Primary Examiner—Fred Teskin
Attorney, Agent, or Firm—Saul R. Bresch

[57] ABSTRACT

A process comprising contacting a mixture comprising ethylene and 1-octene in the gas phase, in a fluidized bed reactor, under polymerization conditions, with a catalyst system comprising:

(a) the reaction product of a vanadium compound and an electron donor impregnated into an inorganic support;
(b) a halocarbon promoter; and
(c) a hydrocarbyl aluminum cocatalyst with the following proviso:
  (i) the partial pressure of ethylene is in the range of about 50 to about 90 psi;
  (ii) the partial pressure of 1-octene is in the range of about 1.5 to about 2.5 psi;
  (iii) the temperature in the reactor is in the range of about 5° C. to about 20° C. above the dew point of 1-octene;
  (iv) the molar ratio of 1-octene to ethylene is in the range of about 0.02:1 to about 0.04:1; and, optionally,
  (v) the superficial gas velocity is in the range of about 1.4 to about 2.7 feet per second.

15 Claims, No Drawings

PROCESS FOR PRODUCING ETHYLENE/1-OCTENE COPOLYMERS HAVING REDUCED STICKINESS

TECHNICAL FIELD

This invention relates to very low density copolymers of ethylene and 1-octene and a process for their production.

BACKGROUND INFORMATION

Polyethylene film based on very low density copolymers of ethylene and 1-octene has a high degree of tear strength and puncture resistance. When large amounts of 1-octene are incorporated into the polyethylene, i.e., amounts sufficient to bring the resin density down to 0.915 gram per cubic centimeter or lower, the film exhibits extraordinary toughness, which is highly desirable for numerous applications such as packaging, geomembranes, greenhouse film, and liners.

An accepted way to produce this very low density copolymer is in the gas phase using a low pressure fluidized bed reactor. However, the relatively low vapor pressure of the 1-octene leads to condensation in the reactor. The condensation of the 1-octene, in turn, results in a swollen or wet resin, which magnifies the inherent stickiness of the low crystallinity polyethylene product. This exceptionally sticky resin impedes the fluidization of the resin particles in the reactor resulting in poor operability, and conveyance and storage of the resin becomes too difficult for a commercial facility.

DISCLOSURE OF THE INVENTION

An object of this invention, therefore, is to provide a gas phase, fluidized bed, commercially feasible process for the production of a copolymer of ethylene and 1-octene, which in film form exhibits a high degree of toughness. Such a process will be characterized by a high degree of operability as reflected in the relatively low degree of stickiness of the copolymer.

According to the present invention, the above object is met by a process comprising contacting a mixture comprising ethylene and 1-octene in the gas phase, in a fluidized bed reactor, under polymerization conditions, with a catalyst system comprising:
  (a) the reaction product of a vanadium compound and an electron donor impregnated into an inorganic support;
  (b) a halocarbon promoter; and
  (c) a hydrocarbyl aluminum cocatalyst.

The process of this invention employs the following conditions.
  (i) the partial pressure of ethylene is in the range of about 50 to about 90 psi;
  (ii) the partial pressure of 1-octene is in the range of about 1.5 to about 2.5 psi;
  (iii) the temperature in the reactor is in the range of about 5° C. to about 20° C. above the dew point of 1-octene;
  (iv) the molar ratio of 1-octene to ethylene is in the range of about 0.02:1 to about 0.04:1; and, optionally,
  (v) the superficial gas velocity is in the range of about 1.8 to about 2.5 feet per second.

DETAILED DESCRIPTION

The vanadium compound can be any of the group of vanadium compounds well known to be useful in forming the complexes used as catalyst precursors in olefin polymerization processes. Examples are vanadium trihalides, vanadium tetrahalides, and vanadium oxyhalides. The halides are generally chlorides, bromides, or iodides, or mixtures thereof. Of these compounds $VCl_3$, $VCl_4$, and $VOCl_3$ can be mentioned. The vanadium acetylacetonates, such as vanadyl triacetylacetonate, are also useful.

The electron donor used in the catalyst is an organic Lewis base, liquid at temperatures in the range of about 0° C. to about 200° C., in which the vanadium compounds are soluble.

The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of vanadium compound and electron donor, the reaction product finally contains about 1 to about 20 moles of electron donor per mole of vanadium compound and preferably about 1 to about 10 moles of electron donor per mole of vanadium compound. About 3 moles of electron donor per mole of vanadium compound has been found to be most preferable.

An optional modifier has the formula $BX_3$ or $AlR_{(3-a)}X_a$ wherein each R is alkyl or aryl and is the same or different; each X is independently chlorine, bromine, or iodine; and a is 0, 1, or 2. While one or more modifiers can be used, two different modifiers are preferred. Preferred modifiers include alkylaluminum mono- and dichlorides wherein each alkyl radical has 1 to 6 carbon atoms, boron trichloride, and trialkylaluminums. A particularly preferred modifier combination is diethylaluminum chloride and tri-n-hexylaluminum. About 0.1 to about 10 moles, and preferably about 0.2 to about 2.5 moles, of modifier(s) can be used per mole of electron donor. The molar ratio of modifier to vanadium can be in the range of about 1:1 to about 10:1 and is preferably in the range of about 2:1 to about 5:1.

Useful halocarbon promoters have the following formula:

$$R_y CX_{(4-y)}$$

wherein
  R=hydrogen or an unsubstituted or halogen substituted alkyl radical having 1 to 6 carbon atoms and each R is the same or different;
  X=a halogen; and
  y=0, 1, or 2.

Preferred promoters include fluoro-, chloro-, and bromo-substituted methane and ethane wherein X is at least 2, e.g., methylene dichloride, 1,1,1-trichloroethane, chloroform, $CBr_4$, $CFCl_3$, hexachloroethane, and CF$_2$ClCCl$_3$. CFCl$_3$ and chloroform are preferred promoters. 1,1-difluorotetrachloroethane is also a desirable promoter. About 0.1 to about 10 moles, and preferably about 0.2 to about 2 moles, of promoter can be used per mole of cocatalyst.

The hydrocarbyl aluminum cocatalyst can be represented by the formula R$_3$Al wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms.

Examples of hydrocarbyl aluminum compounds are as follows: triisobutylaluminum, trihexylaluminum, di-isobutylaluminum hydride, dihexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred cocatalysts are triethylaluminum, triisobutylaluminum, trihexylaluminum, di-isobutylaluminum hydride, and dihexylaluminum hydride. The trialkylaluminum compounds can also serve as modifiers.

While silica is the preferred support, other suitable supports are inorganic oxides such as aluminum phosphate, alumina, silica/alumina mixtures, silica modified with an organoaluminum compound such as triethylaluminum, and silica modified with diethylzinc. A typical support is a solid, particulate, porous material essentially inert to the polymerization. It is used as a dry powder having an average particle size of about 10 to about 250 microns and preferably about 30 to about 100 microns; a surface area of at least about 200 square meters per gram and preferably at least about 250 square meters per gram; and a pore size of at least about 100 Angstroms and preferably at least about 200 Angstroms. Generally, the amount of support used is that which will provide about 0.1 to about 0.6 millimole of vanadium per gram of support and preferably about 0.2 to about 0.5 millimole of vanadium per gram of support. Impregnation of the above mentioned catalyst into a silica support is accomplished by mixing the complex and silica gel in the electron donor solvent followed by solvent removal under reduced pressure.

The modifiers are usually dissolved in an organic solvent such as the electron donor or isopentane or hexane and impregnated into the support following impregnation of the vanadium based complex, after which the catalyst is dried. The cocatalyst is preferably added separately neat or as a solution in an inert solvent, such as isopentane, to the polymerization reaction at the same time as the flow of the ethylene is initiated.

The polymerization is conducted in the gas phase in a fluidized bed usually made up of particulate ethylene/1-octene copolymer.

The fluidized bed reactor can be operated at a temperature in the range of about 1° C. to about 30° C. above the dew point of 1-octene and preferably about 5° C. to about 20° C. above the dew point of 1-octene. The vapor pressure of 1-octene is about 3 psi at typical reactor temperatures. The key to successful gas phase operation with 1-octene is to keep the partial pressure of 1-octene safely below its saturation pressure. In other words, the reactor temperature should be maintained well above the dew point for 1-octene. With this in mind, the reactor can be operated at a temperature in the range of about, 65° C. to about 85° C. and is preferably operated in the range of about 70° C. to about 80° C. It should be noted that the dew point is higher at lower densities because more 1-octene is needed to depress the density. A superficial velocity of about 1.4 to about 2.7 feet per second and preferably about 1.8 to about 2.5 feet per second can also be used in the fluidized reactor bed. Maintaining the superficial velocity within these ranges is particularly important at lower resin densities. The total reactor pressure can be in the range of about 100 to about 500 psia and is preferably in the range of about 200 to about 350 psia. The ethylene partial pressure can be in the range of about 50 to about 90 psi and is preferably in the range of about 65 to about 75 psi. The 1-octene partial pressure can be in the range of about 1.5 to about 2.5 psi and is preferably in the range of about 1.6 to about 2.2 psi. In addition to ethylene and 1-octene, the copolymer can be based on one or more other alpha-olefins having 3 to 7 or 9 to 12 carbon atoms provided that the comonomers other than ethylene and 1-octene, in toto, form less than about 15 percent by weight of the copolymer. The total alpha-olefin partial pressure (other than the ethylene and 1-octene partial pressures) can be in the range of about 0 to about 15 psi and is preferably in the range of about 0 to about 10 psi. Hydrogen or another chain terminator can be added to the mixture of gases in the reactor. The hydrogen partial pressure can be in the range of about 0 to about 6 psi and is preferably in the range of about 0.5 to about 2 psi. The balance of the total reactor pressure can be made up with an inert gas such as nitrogen.

A typical fluidized bed reactor is described in U.S. Pat. No. 4,482,687.

With regard to the additional alpha-olefins, propylene and 1-butene are of most interest, e.g., in C$_2$/C$_8$/C$_4$ and C$_2$/C$_8$/C$_3$ terpolymers.

The gaseous feed streams of ethylene and, optionally, hydrogen, propylene, 1-butene, or other gaseous alpha-olefins are preferably fed to the reactor recycle line as well as liquid 1-octene (boiling point = 122° C.) and other liquid alpha-olefins, the promoter and the cocatalyst solution. Optionally, the liquid cocatalyst and/or promoter can be fed directly to the fluidized bed. The catalyst precursor is preferably injected into the fluidized bed as a solid or a mineral oil slurry. The product composition can be varied by changing the molar ratios in the gas phase in the fluidized bed. The product is continuously discharged from the reactor as the bed level builds up with polymerization. The production rate is controlled by adjusting the catalyst feed rate.

The molar ratios of the reactants are about as follows:

| Reactants | Broad | Preferred |
| --- | --- | --- |
| 1-octene:ethylene | 0.02:1 to 0.04:1 | 0.022:1 to 0.032:1 |
| hydrogen:ethylene | 0 to 0.1:1 | 0.01:1 to 0.03:1 |
| propylene:ethylene | 0 to 0.2:1 | 0:1 to 0.15:1 |
| 1-butene:ethylene | 0 to 0.1:1 | 0:1 to 0.07:1 |
| other alpha-olefins (C$_5$ to C$_7$ or C$_9$ to C$_{12}$):ethylene | 0 to 0.05:1 | 0:1 to 0.03:1 |

The hydrogen:ethylene molar ratio is adjusted to control average molecular weights. As noted, the alpha-olefins (other than ethylene and 1-octene) can be present in a total amount of up to 15 percent by weight of the copolymer and, if used, are preferably included in the copolymer in a total amount of about 0 to about 10 percent by weight based on the weight of the copolymer.

Several steps can be taken, in addition to temperature control, to prevent agglomeration of the elastomeric polymer. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The residence time of the mixture of reactants including gaseous and liquid reactants, catalyst precursor, promoter, cocatalyst, and resin in the fluidized bed can be in the range of about 1 to about 12 hours and is preferably in the range of about 2 to about 5 hours. The final product can contain the following amounts of reacted comonomer: about 75 to about 90 percent by weight ethylene; about 10 to about 25 percent by weight 1-octene; and 0 to about 15 percent by weight other alpha-olefins, all based on the weight of the copolymer.

The advantages of the gas phase fluidized bed process over solution, suspension or other gas phase processes are: (i) simplicity; (ii) elimination of solvent or diluent; (iii) superior product properties; (iv) elimination of catalyst residue removal step; (v) granular products can be directly transferred to either pelleting or baling after residual monomer gas purging; (vi) process can be operated at lower temperatures while maintaining reasonable catalyst productivity; and (vii) capability of producing products having a broad range of molecular weights, particularly those of high molecular weight.

The ethylene/1-octene copolymers produced by subject process feature unusually high melt flow ratios, e.g., a melt flow ratio of up to 177 at a density of 0.9045 gram per cubic centimeter. Further, the melt flow ratio increases sharply with decreasing resin density. The high melt flow ratio is advantageous in that it facilitates processing of the resin.

For ethylene/1-octene copolymers having a density of less than 0.900 gram per cubic centimeter, unreacted 1-octene dissolved in the resin leaving the reactor can exceed 20 weight percent. This dissolved 1-octene can affect stickiness substantially. Purging of the unreacted comonomer can be achieved at near reactor temperature in one or two hours if efficient contact between purge nitrogen and resin is maintained.

In any case, ethylene/1-octene resins having densities of at least about 0.910 gram per cubic centimeter and melt indices of no greater than about 0.3 are preferred for commercial processing because of the problem of stickiness.

The catalyst system is similar to the catalyst system described in U.S. Pat. No. 4,508,842. A typical fluidized bed reactor is described in U.S. Pat. No. 4,482,687. Both patents are incorporated by reference herein.

The invention is illustrated by the following examples.

EXAMPLES 1 TO 3

The catalyst precursor is prepared by impregnating vanadium trichloride into silica that is dehydrated at 600° C. to remove water and most of the surface silanols. The impregnation is accomplished by mixing the dehydrated silica into the precursor solution, which is prepared by dissolving vanadium trichloride in tetrahydrofuran (THF) at 70° to 80° C., and drying most of the tetrahydrofuran off under the nitrogen atmosphere. Catalyst is then reduced with diethylaluminum chloride in alkane solution.

The polymerization is conducted in a continuous, gas phase, fluidized bed reactor. The fluidized bed is made up of ethylene/1-octene copolymer particles. The gaseous feed streams of ethylene and hydrogen are fed to the reactor recycle line as well as liquid 1-octene and promoter. Cocatalyst, 10 percent by weight tri-isobutyl aluminum in isopentane, is fed directly into the fluidized bed reactor to enhance mixing and dispersion. The catalyst is introduced into the fluidized bed in solid particulate form using purified nitrogen as a carrier gas. A continuous purge flow of nitrogen is maintained in the product discharge line. A static probe is installed in the reactor to monitor static level. Before use, the 1-octene is purified by deaeration and drying.

The percent by weight of vanadium is 1.23 percent based on the weight of the catalyst. The percent by weight of aluminum in the catalyst precursor is 2.75 percent based on the weight of the catalyst. The reactor temperature is 75° C. and the reactor pressure is 315 psia. The promoter is chloroform and the percent by weight chloroform is 10 percent by weight in the dilution solvent, isopentane.

It is observed that reactor operability is excellent; catalyst productivity is low because of the low ethylene partial pressure; and that 1-octene does not poison the catalyst system.

Variable conditions and resin properties are set forth in the Table.

TABLE

| Example | 1 | 2 | 3 |
|---|---|---|---|
| $H_2/C_2$ (molar ratio) | 0.0227 | 0.0159 | 0.0123 |
| $C_8/C_2$ (molar ratio) | 0.0249 | 0.0280 | 0.0296 |
| ethylene partial pressure (psi) | 73 | 70 | 71 |
| $N_2$ (% by vol) | 76 | 77 | 76 |
| production rate (lbs/hr) | 19 | 25 | 21 |
| residence time (hours) | 4.4 | 3.3 | 4 |
| cocatalyst feed rate (cc/hr) | 81 | 85 | 73 |
| bed weight (lbs) | 83 | 83 | 83 |
| fluidized bulk density (lbs/cu ft) | 12.1 | 11.4 | 11.5 |
| superficial velocity (ft/sec) | 2.3 | 2.3 | 2.3 |

TABLE-continued

| Example | 1 | 2 | 3 |
|---|---|---|---|
| promoter feed rate (cc/hr) | 58 | 77 | 73 |
| promoter concentration (ppmv) | 8 | 14 | 20 |
| 1-octene partial pressure (psi) | 1.82 | 1.96 | 2.10 |
| 1-octene dew point (°C.) | 60 | 62 | 64 |
| melt index (dg/10 min) | 0.42 | 0.28 | 0.13 |
| flow index | 51 | 41 | 22 |
| melt flow ratio | 121 | 147 | 177 |
| density (g/cc) | 0.911 | 0.906 | 0.9045 |
| V residue (ppmw) | 20.3 | 16.8 | 13.1 |
| ash (wt %) | 0.147 | 0.126 | 0.097 |
| bulk density (lbs/cu ft) | 20.2 | 19.0 | 18.1 |
| average particle size (inch) | 0.026 | 0.030 | — |
| fines (wt % thru 120 mesh) | 0 | 0 | — |

Notes to Table:

1. $H_2/C_2$ (molar ratio) is the molar ratio of hydrogen to ethylene.

2. $C_8/C_2$ (molar ratio) is the molar ratio of 1-octene to ethylene.

3. $N_2$ (% by vol) is the percent by weight of nitrogen based on the volume of gas in the reactor.

4. Production rate (lbs/hr) is the number of pounds of ethylene/1-octene copolymer produced per hour.

7. Bed weight (lbs) is the weight of the fluidized bed.

8. Fluidized bulk density (lbs/cu ft) is the pounds per cubic foot of fluidized bed in the fluidized state.

9. Superficial velocity (ft/sec) is the velocity of the mixture of gases in the reactor in feet per second.

10. Promoter concentration (ppmv) is the parts per million by volume of promoter in the gas in the reactor.

11. Melt Index (dg/10 min) is determined under ASTM D-1238, Condition E. It is measured at 190° C. and reported as decigrams per 10 minutes.

12. Flow Index is determined under ASTM D-1238, Condition F. It is measured at 10 times the weight used in the melt index test above.

13. Melt Flow Ratio is the ratio of flow index to melt index.

14. Density (g/cc) is the density of the ethylene/1-octene copolymer product in grams per cubic centimeter.

15. V residue (ppmw) is the parts per million by weight of vanadium in the resin. The value is determined by colorimetric means.

16. Ash (wt. %) is determined under ASTM D-229.49.

We claim:

1. A process comprising contacting a mixture comprising ethylene and 1-octene in the gas phase, in a fluidized bed reactor, under polymerization conditions, with a catalyst system comprising:
   (a) the reaction product of a vanadium compound and an electron donor impregnated into an inorganic support;
   (b) a halocarbon promoter; and
   (c) a hydrocarbyl aluminum cocatalyst with the following proviso:
   (i) the partial pressure of ethylene is in the range of about 50 to about 90 psi;
   (ii) the partial pressure of 1-octene is in the range of about 1.5 to about 2.5 psi;
   (iii) the temperature in the reactor is in the range of about 1° C. to about 30° C. above the dew point of 1-octene;
   (iv) the molar ratio of 1-octene to ethylene is in the range of about 0.02:1 to about 0.04:1; and, optionally,
   (v) the superficial gas velocity is in the range of about 1.4 to about 2.7 feet per second.

2. The process of claim 1 wherein the electron donor is an organic Lewis base in which the vanadium compound is soluble.

3. The process of claim 1 wherein R has 1 to 14 carbon atoms.

4. The process of claim 1 wherein the electron donor is tetrahydrofuran.

5. The process of claim 1 wherein the promoter has the formula:

$$R_yCX_{(4-y)}$$

wherein
R = hydrogen or an unsubstituted or halogen substituted alkyl radical having 1 to 6 carbon atoms and each R is the same or different;
X = a halogen; and
y = 0, 1, or 2.

6. The process of claim 5 wherein the promoter is chloroform, methylene chloride, 1,1,1-trichloroethane, trichlorofluoromethane, or 1,1-difluorotetrachloroethane.

7. The process of claim 1 wherein the partial pressure of ethylene is in the range of about 65 psi to about 75 psi.

8. The process of claim 1 wherein the partial pressure of 1-octene is in the range of about 1.6 psi to about 2.2 psi.

9. The process of claim 1 wherein the temperature in the reactor is in the range of about 5° C. to about 20° C. above the dew point of 1-octene.

10. The process of claim 1 wherein the molar ratio of 1-octene to ethylene is in the range of about 0.022:1 to about 0.032:1.

11. The process of claim 1 wherein the superficial gas velocity is in the range of about 1.8 to about 2.5 feet per second.

12. The process of claim 1 wherein hydrogen is introduced into the mixture and the molar ratio of hydrogen to ethylene is in the range of up to about 0.1:1.

13. The process of claim 1 wherein the process is continuous.

14. The process of claim 1 wherein one or more additional alpha-olefins are introduced into the mixture with the proviso that the total amount of additional reacted alpha-olefins is no greater than about 15 percent by weight of the copolymer produced by the process.

15. The process of claim 12 wherein the additional alpha-olefins are propylene and/or 1-butene.

* * * * *